(No Model.)

J. H. JENCKS.
CUTTING PLIERS.

No. 298,587. Patented May 13, 1884.

WITNESSES:
Rudolf B. Gettman
Jas. F. Macshane

INVENTOR
John N. Jencks.
BY James A. Whitney
ATTORNEY

UNITED STATES PATENT OFFICE.

JOHN H. JENCKS, OF WATERBURY, CONNECTICUT.

CUTTING-PLIERS.

SPECIFICATION forming part of Letters Patent No. 298,587, dated May 13, 1884.

Application filed October 15, 1883. (No model.)

*To all whom it may concern:*

Be it known that I, JOHN H. JENCKS, of Waterbury, in the county of New Haven and State of Connecticut, have invented an Improvement in Cutting-Pliers, of which the following is a specification.

This invention relates to that class of cutting-pliers the jaws of which have their cutting-edges arranged transversely to the length of the implement; and its object is to provide cutting-pliers of this class in which the edge or cutting portions of the jaws shall be removable and at the same time be as firmly secured in place and as effective for the purpose as if made in one with the other portions of the jaw, as with the ordinary cutting-pliers of the class mentioned.

My invention comprises a novel means whereby these objects are effectually secured.

Figure 1:
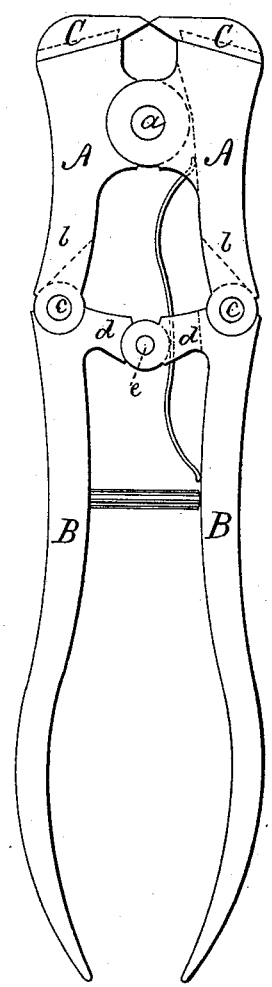
Figure 2:
Figure 3:
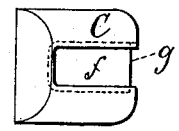

Figure 1 is a side view of a cutting-pliers embracing my said invention. Figs. 2, 3, 4, 5, 6, and 7 are detailed views illustrating different parts thereof.

Figure 4:
Figure 5:
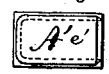
Figure 6:
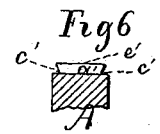
Figure 7:

A A are jaws of the cutting-pliers, connected by the usual pivot, $a$. These jaws may have lever ends $b$, extended to form the handles of the pliers; or, when desired, the said lever-arms $b$ may be pivoted, as shown at $c$, to the elbow-levers B, the elbows or short arms $d$ of which are connected by the pivot $e$ to form a toggle-joint, the jaws A being in this case operated by the levers B, serving as handles. The outer end of each jaw is squared in a plane substantially at right angles to the length of the implement, and upon this square is provided a dovetailed spline, A', the said spline having its inner end, $a'$, sloping inward toward its bottom, as shown in Fig. 4, and its lateral edges $c'$ in like manner sloping inward, as shown in Fig. 6. This spline is flat on its outer surface, $e'$, as indicated in Figs. 4, 5, and 6, Fig. 4 being a side view, Fig. 5 a plan view, and Fig. 6 a transverse sectional view representing said spline and the adjacent portions of the jaw.

C is the detachable edge or cutting portion of the jaw. (Represented in section in Fig. 2 and in inverted plan in Fig. 3.) Formed in the inner side of this cutting portion C is a socket, $f$, which corresponds in shape and size with the spline A', the said socket being of dovetailed form at its inner end and at its sides, but open at its outer end, $g$, in order that it may be placed upon the spline A', as shown in sectional view, Fig. 7. It is of course to be understood that each of the jaws A is constructed as hereinbefore set forth, and provided, as described, with a detachable edge or cutting portion, C, as explained. The said detachable edges or cutting portions being attached to the jaws, as set forth, the outward thrust upon the said portion C in the use and operation of the implement causes the inner end of the spline A' to bear against its correspondingly-dovetailed inner end of the socket $f$, thereby resisting the thrust upon the said edge or cutting portions C, while the dovetailed sides of the spline A', being snugly fitted to the correspondingly-shaped sides of the socket $f$, insure the firm and sure retention of the portion C in place.

What I claim as my invention is—

In a cutting-pliers, the jaws A, having at their outer ends the spline A', of dovetailed form at its sides and inner ends, in combination with the detachable edge or cutting portion C, having sockets $f$, corresponding in shape to the spline A', all substantially as and for the purpose herein set forth.

JOHN H. JENCKS.

Witnesses:
JAS. F. MACSHANE,
BENJ. F. DE VOE.